United States Patent
Endoh et al.

(10) Patent No.: US 6,732,525 B2
(45) Date of Patent: May 11, 2004

(54) WASTE HEAT RECOVERY DEVICE FOR INTERNAL COMBUSTION ENGINE

(75) Inventors: Tsuneo Endoh, Wako (JP); Haruhiko Komatsu, Wako (JP); Masahiko Minemi, Wako (JP); Tsuyoshi Baba, Wako (JP); Kensuke Honma, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/181,627

(22) PCT Filed: Jan. 17, 2001

(86) PCT No.: PCT/JP01/00262
§ 371 (c)(1),
(2), (4) Date: Nov. 14, 2002

(87) PCT Pub. No.: WO01/53661
PCT Pub. Date: Jul. 26, 2001

(65) Prior Publication Data
US 2003/0106316 A1 Jun. 12, 2003

(30) Foreign Application Priority Data
Jan. 18, 2000 (JP) ........................................ 2000-013953
Jan. 10, 2001 (JP) ........................................ 2001-002593

(51) Int. Cl.$^7$ ........................... F01K 23/10; F01K 25/08
(52) U.S. Cl. .............................. 60/618; 60/651; 60/671
(58) Field of Search .................... 60/651, 670, 671, 60/676, 618; F02G 5/04; F01K 25/10

(56) References Cited

U.S. PATENT DOCUMENTS

| | | | | |
|---|---|---|---|---|
| 4,753,079 A | * | 6/1988 | Sumitomo | 60/676 |
| 5,351,487 A | * | 10/1994 | Abdelmalek | 60/618 |
| 6,513,482 B1 | | 2/2003 | Endoh et al. | 60/618 |
| 2003/0000213 A1 | * | 1/2003 | Christensen et al. | 60/670 |

FOREIGN PATENT DOCUMENTS

| | | | | |
|---|---|---|---|---|
| EP | 60159 A1 | * | 9/1982 | F02G/5/04 |
| EP | 298304 A1 | * | 1/1989 | F02G/5/04 |
| JP | 57-26363 A | | 2/1982 | F25B/13/00 |
| JP | 61076710 A | * | 4/1986 | F01K/25/10 |
| JP | 6-26400 A | | 2/1994 | F02G/5/04 |
| JP | 6-88523 A | | 3/1994 | F01N/5/02 |
| JP | 8-144850 A | | 6/1996 | F02G/5/04 |

* cited by examiner

*Primary Examiner*—Thomas Denion
*Assistant Examiner*—Thai Ba Trieu
(74) *Attorney, Agent, or Firm*—Birch, Stewart, Kolasch & Birch, LLP

(57) ABSTRACT

A waste heat recovery system for an internal combustion engine. The internal combustion engine includes first and second raised temperature portions. The raised temperature is higher at the first portion than at the second portion. A first evaporating portion generates a first vapor from the first raised temperature portion. A second evaporating portion generates a second vapor from the second raised temperature portion and with a lower pressure than the first vapor. First and second energy converting portions of a displacement type expander converts expansion energy of the first and second vapor into mechanical energy. A condenser and a supply pump are also provided.

8 Claims, 12 Drawing Sheets

WASTE HEAT RECOVERY DEVICE FOR INTERNAL COMBUSTION ENGINE

This-application is the national phase under 35 U.S.C. §371 of PCT International Application No. PCT/JP01/00262 which has an International filing date of Jan. 17, 2001, which designated the United States of America.

FIELD OF THE INVENTION

The present invention relates to a waste heat recovery system for an internal combustion engine, particularly to a waste heat recovery system, to which Rankine cycle is applied, for recovering waste heat of the internal combustion engine that generates at least two, first and second raised temperature portions by operation, a degree of raised temperature being higher at the first raised temperature portion than at the second raised temperature portion.

BACKGROUND ART

A known waste heat recovery system of this type is described in Japanese Patent Application Laid-Open No. 6-88523.

However, in the conventional device, raised temperature cooling water after cooling an exhaust port of an internal combustion engine is introduced into a heater provided in an exhaust pipe to generate vapor, and thus has a problem that heat of an exhaust gas having lower temperature than the raised temperature cooling water is disposed of without being recovered in the heater, thereby reducing a waste heat recovery rate.

DISCLOSURE OF THE INVENTION

The present invention has an object to provide a waste heat recovery system for sufficiently recovering waste heat from at least two raised temperature portions generated in an internal combustion engine by operation, efficiently converting recovered heat energies to mechanical energies, and integrating the mechanical energies to be output.

To attain the above described object, the present invention provides a waste heat recovery system for an internal combustion engine, to which Rankine cycle is applied, for recovering waste heat of the internal combustion engine that generates at least two, first and second raised temperature portions by operation, a degree of raised temperature being higher at the first raised temperature portion than at the second raised temperature portion, wherein the device includes: evaporating means having at least two, first and second evaporating portions, the first evaporating portion generating a first vapor with raised temperature by using the first raised temperature portion, while the second evaporating portion generating a second vapor with raised temperature by using the second raised temperature portion and with a lower pressure than the first vapor; an expander having at least two, first and second energy converting portions, the first energy converting portion converting an expansion energy of the first vapor introduced from the first evaporating portion into a mechanical energy, while the second energy converting portion converting an expansion energy of the second vapor introduced from the second evaporating portion into a mechanical energy, and both mechanical energies being integrated to be output; a condenser for liquefying the first and second vapors, which are exhausted from the expander, with dropped pressure after the conversion; and a supply pump for supplying liquid from the condenser to the first and second evaporating portions, respectively.

Configured as described above, waste heat can be sufficiently recovered from each raised temperature portion of the internal combustion engine and integrated to produce relatively high output. The expander in this case may be either of displacement type or non-displacement type.

According to the present invention, there is provided a waste heat recovery system for an internal combustion engine, to which Rankine cycle is applied, for recovering waste heat of the internal combustion engine that generates at least two, first and second raised temperature portions by operation, a degree of raised temperature being higher at the first raised temperature portion than at the second raised temperature portion, wherein the device includes: evaporating means having at least two, first and second evaporating portions, the first evaporating portion generating a first vapor with raised temperature by the first raised temperature portion, while the second evaporating portion generating a second vapor with raised temperature by using the second raised temperature portion and with a lower pressure than the first vapor; a displacement type expander having at least two, first and second energy converting portions, the first energy converting portion converting an expansion energy of the first vapor introduced from the first evaporating portion into a mechanical energy, while the second energy converting portion converting an expansion energy of the second vapor introduced from the second evaporating portion into a mechanical energy, and both mechanical energies being integrated to be output; a condenser for liquefying the first and second vapors, which are exhausted from the displacement type expander, with dropped pressure after the conversion; and a supply pump for supplying liquid from the condenser to the first evaporating portion and the second evaporating portion, respectively.

Configured as described above, the same operation and effect as described above can be obtained. For the displacement type expander, it has a wide rated operation area, so that even if flow rates of the vapors in the first energy converting portion and the second energy converting portion vary with variation in temperature at the first raised temperature portion and the second raised temperature portion in the internal combustion engine, the expander efficiently operates within a wide rotation area in proportion to the flow rates of the vapors, and integrates both mechanical energies of the first energy converting portion and the second energy converting portion to be efficiently output. On the other hand, since the non-displacement type expander has a narrow rated operation area, it is difficult to efficiently operate within a wide rotation area in accordance with variation in flow rates of the vapors. Thus, to efficiently operate the non-displacement type expander, the flow rates of the vapors are to be controlled within a range suited for the rated operation area. In this view, as an expander, the displacement type one may be suitable.

BEST MODE FOR CARRYING OUT THE INVENTION

Figure 1:
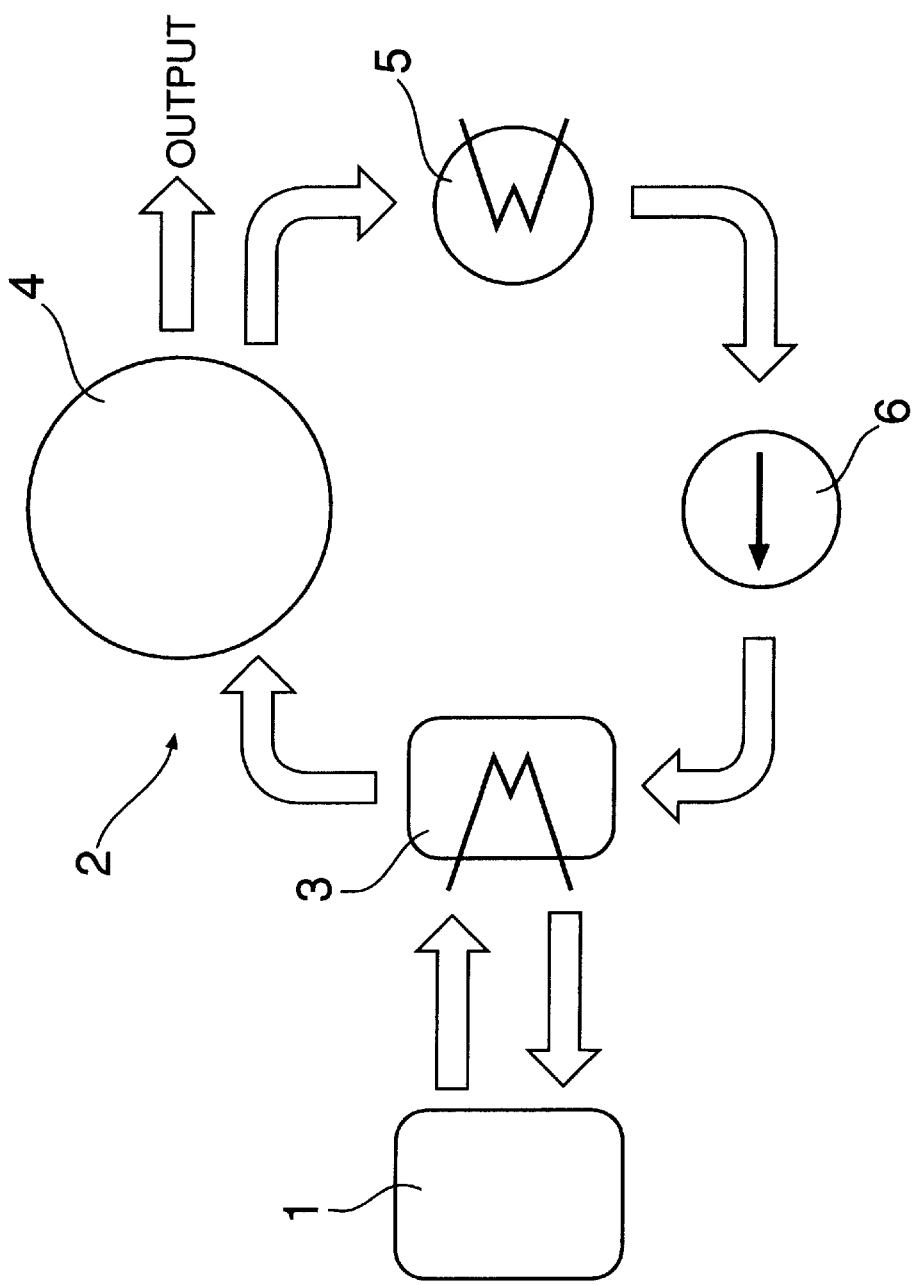
FIG. 1 is a schematic view of a waste heat recovery system, to which Rankine cycle is applied, for an internal combustion engine.

In FIG. 1, a waste heat recovery system 2, to which Rankine cycle is applied, for an internal combustion engine 1 comprises evaporating means 3 for generating a vapor with raised temperature, that is, raised temperature vapor, using waste heat of the internal combustion engine 1 as a heat source; a displacement type expander 4 for converting an expansion energy of the raised temperature vapor into a mechanical energy to be output; a condenser 5 for liquefying the vapor, which is exhausted from the displacement type expander 4, with dropped temperature and dropped pressure after the conversion, that is, dropped temperature/pressure vapor; and a supply pump 6 for pressurizing and supplying liquid, for example, water, from the condenser 5 to the evaporating means 3.

Figure 2:
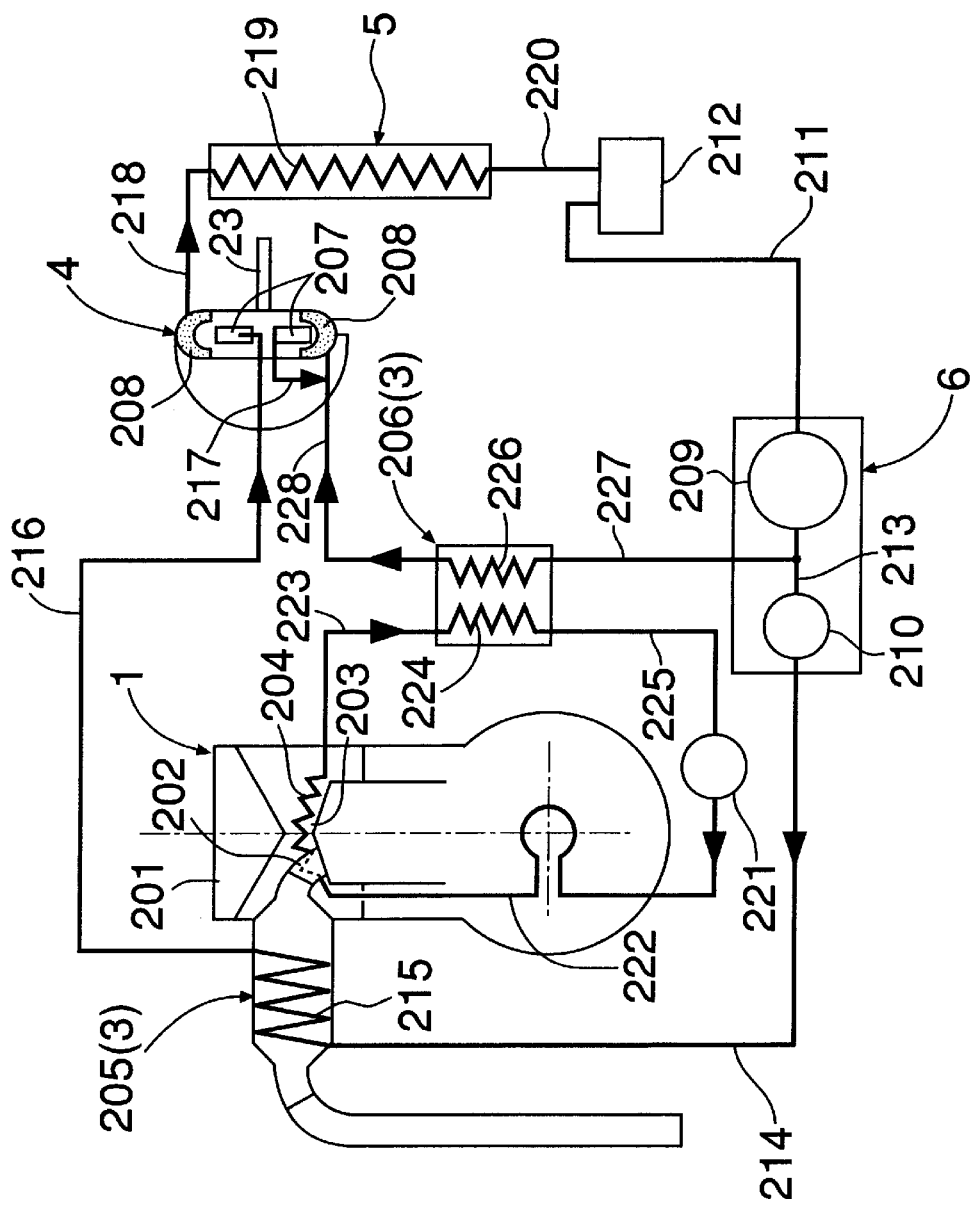
FIG. 2 illustrates a first embodiment.

In FIG. 2, the internal combustion engine 1 generates at least two, in the embodiment two, first and second raised temperature portions by operation thereof. A degree of raised temperature is higher at the first raised temperature portion than at the second raised temperature portion. In this embodiment, an exhaust port 202 of a cylinder head 201 is selected as the first raised temperature portion, and a combustion chamber forming wall 203 of the cylinder head 201 is selected as the second raised temperature portion, where a cooling oil passage 204 is placed. An exhaust manifold may be used as the first raised temperature portion.

Figure 3:
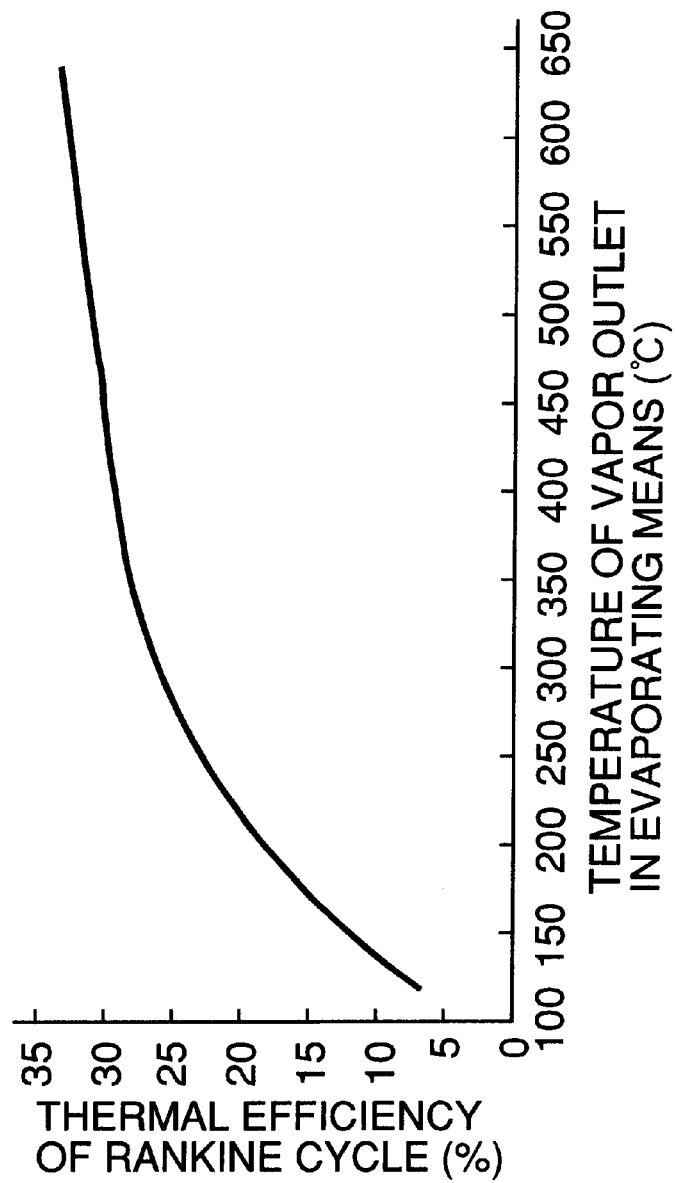
FIG. 3 is a graph illustrating a relationship between temperature of a vapor outlet in evaporating means and thermal efficiency of Rankine cycle.

FIG. 3 illustrates a relationship between temperature of a vapor outlet in the evaporating means 3 and thermal efficiency of Rankine cycle. It is apparent in FIG. 3 that higher temperature causes higher thermal efficiency. Thus, the above described two positions are selected as the first and second raised temperature portions also in view of easy recovery of waste heat from the internal combustion engine 1.

The evaporating means 3 has at least two, in the embodiment two, first and second evaporating portions 205 and 206. The first evaporating portion 205 has an inlet in the exhaust port 202 and thus generates a first vapor with raised temperature, that is, a first raised temperature vapor using an exhaust gas of the exhaust port 202. On the other hand, the second evaporating portion 206 generates a second vapor with raised temperature, that is, a second raised temperature vapor by heat exchange using raised temperature oil having passed through the cooling oil passage 204 and with lower temperature and a lower pressure than the first raised temperature vapor.

A detailed structure of the displacement type expander 4 will be described later, and the expander 4 has at least two, in the embodiment two, first and second energy converting portions 207 and 208. The first energy converting portion 207 has a piston and a vane pump structure, and converts an expansion energy of the first raised temperature vapor introduced from the first evaporating portion 205 into a mechanical energy. On the other hand, the second energy converting portion 208 shares the vane pump structure, and has functions of converting an expansion energy of the first vapor, which is introduced from the first evaporating portion 205, with dropped temperature and dropped pressure after the conversion, that is, dropped temperature/pressure vapor, into a mechanical energy, and converting an expansion energy of the second raised temperature vapor introduced from the second evaporating portion 206 into a mechanical energy. In the embodiment, the second raised temperature vapor is merged into the dropped temperature/pressure vapor by the first raised temperature vapor, so that the mechanical energies by the first raised temperature vapor, the dropped temperature/pressure vapor thereof, and the second raised temperature vapor are integrated to be output from the expander 4 as a rotation energy of an output shaft 23 thereof.

The supply pump 6 has a first pump 209 and a second pump 210 for increasing a pressure that increases a discharge pressure of the first pump 209. An intake port of the first pump 209 is connected through a conduit 211 to a water tank 212 attached to the condenser 5, and a discharge port thereof is connected through a conduit 213 to an intake port of the second pump 210. A discharge port of the second pump 210 is connected through a conduit 214 to a water inlet of a vapor generating pipe 215 in the first evaporating portion 205, and a discharge pressure thereof is set as a pressure of the first raised temperature vapor, and a vapor outlet thereof is connected through a conduit 216 to a vapor inlet side of the first energy converting portion 207 in the expander 4.

A vapor outlet side of the first energy converting portion 207 is connected through a vapor passage 217 in the expander 4 to a vapor inlet side of the second energy converting portion 208, and a vapor outlet side thereof is connected through a conduit 218 to a vapor inlet side of a cooling passage 219 in the condenser 5. An exhaust side of the cooling passage 219 is connected through a conduit 220 to the water tank 212.

A discharge port of an oil pump 221 is connected through a lubricating passage 222 of the internal combustion engine 1 to an oil inlet of the cooling oil passage 204, and an oil outlet of the cooling oil passage 204 is connected through a conduit 223 to an inlet of an oil pipe 224 for heat exchange in the second evaporating portion 206. An outlet of the oil pipe 224 is connected through a conduit 225 to an intake port of the oil pump 211.

A water inlet of a vapor generating pipe 226 in the second evaporating portion 206 is connected through a conduit 227 to the conduit 213 between the first and second pumps 209 and 210, and a vapor outlet of the vapor generating pipe 226 is connected through a conduit 228 to the vapor passage 217 between the first and second energy converting portions 207 and 208 of the expander 4.

In the above described configuration, the internal combustion engine 1 is operated and the oil pump 221 is simultaneously driven, and the supply pump 6 is driven to feed pressure water with a high discharge pressure by the first and second pumps 209 and 210 to the first evaporating portion 205, and then the first raised temperature vapor is generated. In this case, the pressure of the first raised temperature vapor is set to the discharge pressure of the second pump 210. The first raised temperature vapor is introduced in the first energy converting portion 207 in the expander 4, the expansion energy thereof is converted into the mechanical energy, and the dropped temperature/pressure vapor after the conversion is introduced in the second energy converting portion 208.

On the other hand, pressure water by the first pump 209 with a lower discharge pressure than the above described discharge pressure is fed to the second evaporating portion 206, and then the second raised temperature vapor is generated. In this case, a pressure of the second raised temperature vapor is set to the discharge pressure of the first pump 209. The second raised temperature vapor is introduced in the second energy converting portion 208 in the expander 4, thus the dropped temperature/pressure vapor and the second raised temperature vapor are merged, their expansion energies are converted into the mechanical energies, and the integrated energy of the mechanical energies by the first raised temperature vapor, the dropped temperature/pressure vapor thereof, and the second raised temperature vapor is output as the rotation energy of the output shaft 23 in the expander 4.

As described above, the pressure water with the high discharge pressure is fed to the first evaporating portion 205 with a high degree of raised temperature, thereby allowing efficient recovery of heat of the exhaust gas in the first evaporating portion 205. On the other hand, pressure water with the discharge pressure lower than that of the above described pressure water is fed to the second evaporating portion 206 with a lower degree of raised temperature than the first evaporating portion 205, thereby allowing sufficient recovery of heat of raised temperature oil in the second evaporating portion 206 by cooling the combustion chamber forming wall 203. In this case, the pressure water to the second evaporating portion 206 is taken out from between the first and second pumps 209 and 210, so that the pressure of the pressure water is set to the discharge pressure of the first pump 209, thereby allowing reduction in pump loss caused when, for example, a discharge pressure of a high pressure pump is reduced using a throttle.

By the expander 4, the heat energies recovered in the first and second evaporating portions 205 and 206, thus the expansion energies are efficiently converted into the mechanical energies, and further, the conversion is performed twice from the first raised temperature vapor to finally integrate the mechanical energies to be output, thereby producing high output. For example, combined use of the first and second evaporating portions 205 and 206 allows increase in output by about 12% as compared with the case of using only the first evaporating portion 205.

The output taken out of the displacement type expander 4 is proportional to the flow rate of the vapor of the expander 4, thus an expansion ratio of the first raised temperature vapor is set such that the pressure of the dropped temperature/pressure vapor thereof matches the pressure of the second raised temperature vapor, thereby increasing a total flow rate of the vapor in the second energy converting portion 208 to allow the output to be taken out most effectively.

Figure 4:
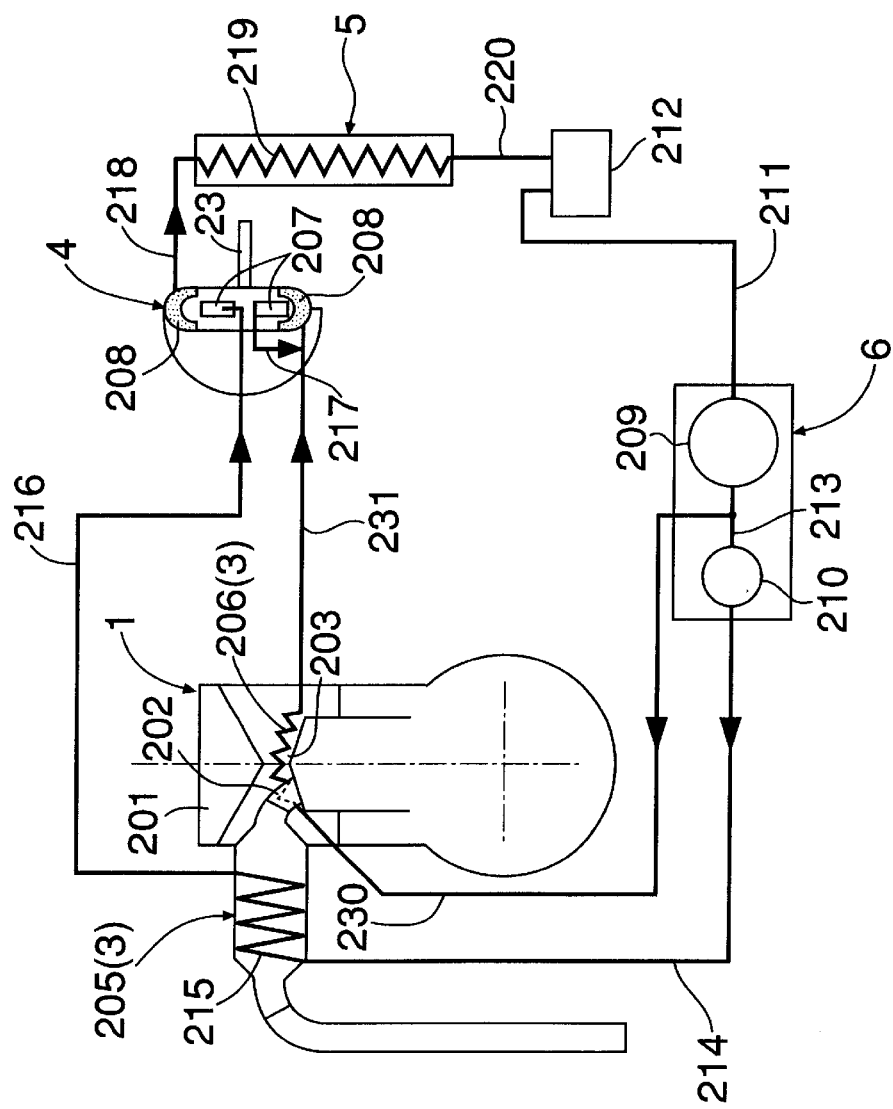
FIG. 4 illustrates a second embodiment.

In the embodiment shown in FIG. 4, the cooling oil passage 204 in FIG. 2 is replaced by a cooling water passage that functions as a second evaporating portion 206, a water inlet thereof is connected through a conduit 230 to a conduit 213 between first and second pumps 209 and 210, and a vapor outlet of the second evaporating portion 206 is connected through a conduit 231 to a vapor passage 217 in an expander 4. The other configurations are the same as in FIG. 2, thus like reference numerals denote like component parts in FIGS. 2 and 4.

An expander 4 is configured as described below.

In FIGS. 5 to 8, a casing 7 comprises first and second half bodies 8, 9 made of metal. Each of the half bodies 8, 9 comprises a main body 11 having a substantially oval recess 10 and a circular flange 12 integral with the main body 11, and the circular flanges 12 are superposed via a metal gasket 13 to form a substantially oval rotor chamber 14. An outer surface of the main body 11 of the first half body 8 is covered with a main body 16, in the form of a deep bowl, of a shell-shaped member 15, a circular flange 17 integral with the main body 16 is superposed on the circular flange 12 of the first half body 8 via a gasket 18, and three circular flanges 12, 12, 17 are fastened by a bolt 19 at a plurality of circumferential positions. A junction chamber 20 is thereby formed between the shell-shaped member 15 and the main bodies 11, 16 of the first half body 8.

The main bodies 11 of the half bodies 8, 9 have hollow shaft receiving tubes 21, 22 projecting outwards at their outer surfaces, and by the hollow shaft receiving tubes 21, 22, a large diameter portion 24 of a hollow output shaft 23 penetrating the rotor chamber 14 is turnably supported via a bearing metal (or a bearing made of resin) 25. An axis L of the output shaft 23 thereby passes an intersection point of a large diameter and a small diameter in the substantially oval rotor chamber 14. A small diameter portion 26 of the output shaft 23 projects outwards beyond a hole 27 at the hollow shaft receiving tube 22 of the second half body 9 and is connected to a transmission shaft 28 via spline coupling 29. The small diameter portion 26 and the hole 27 are sealed by two seal rings 30.

Accommodated in the rotor chamber 14 is a circular rotor 31, and a shaft mounting hole 32 at its center is in a fitted relationship to the large diameter portion 24 of the output shaft 23 to provide an engagement portion 33 between the two 31, 24. A rotation axis of the rotor 31 thereby matches the axis L of the output shaft 23, thus "L" is commonly used as reference character of the rotation axis.

The rotor 31 is formed with a plurality of, in this embodiment twelve, slot-shaped spaces 34 radially extending from the shaft mounting hole 32 about the rotation axis L at even intervals on the circumference. Each space 34 is circumferentially narrow and in substantially U shape in a phantom plane perpendicular to both end surfaces 35 so as to sequentially open into both the end surfaces 35 and an outer peripheral surface 36 of the rotor 31.

In the respective slot-shaped spaces 34, first to twelfth vane-piston units U1 to U12 with the same structure are mounted so as to freely reciprocate in the respective radial direction as follows. The space 34 of substantially U shape is formed with a stepped hole 38 at a portion 37 comparting the inner peripheral side of the space 34, and a stepped cylinder member 39 made of ceramic (for example, carbon) is fitted in the stepped hole 38. An end surface of a small diameter portion a of the cylinder member 39 abuts against an outer peripheral surface of the large diameter portion 24 of the output shaft 23, and a small diameter hole b thereof communicates with a through-hole c opening into the outer peripheral surface of the large diameter portion 24. A guide tube 40 is disposed outside the cylinder member 39 so as to be positioned coaxially with the member 39. An outer end of the guide tube 40 is locked by an opening of the space 34 on an outer peripheral surface of the rotor 31, and an inner end of the guide tube 40 is fitted in a large diameter hole d of the stepped hole 38 to abut against the cylinder member 39. The guide tube 40 has a pair of slots e extending from its outer end to its inner end in an opposed manner, and both the slots e face the space 34. A piston 41 made of ceramic is slidably fitted in a large diameter cylinder hole f of the cylinder member 39, and a tip side of the piston 41 is always positioned in the guide tube 40.

Figure 5:
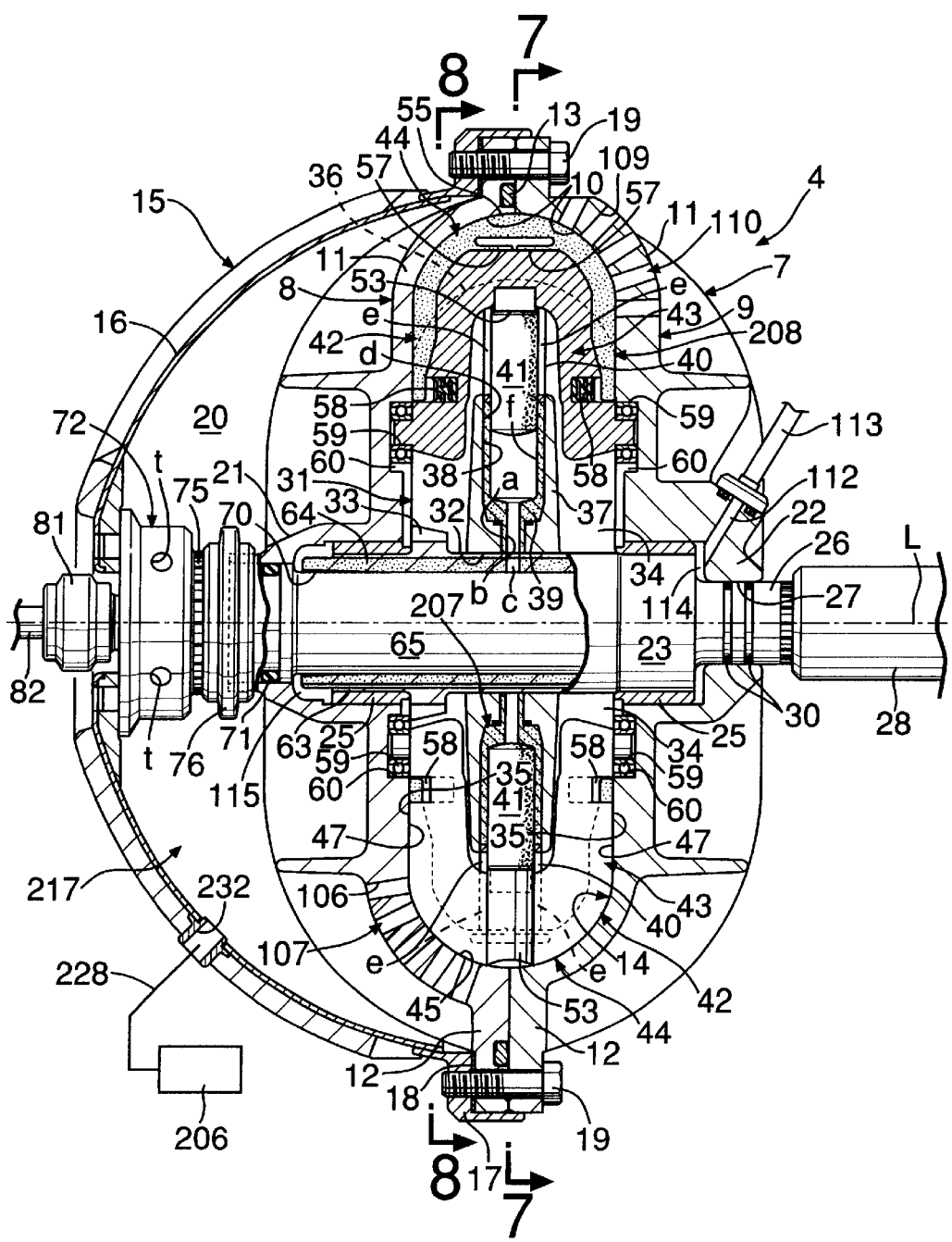
FIG. 5 is a vertical sectional view of an expander and corresponds to a sectional view taken along a line 5—5 in FIG. 8.
Figure 9:
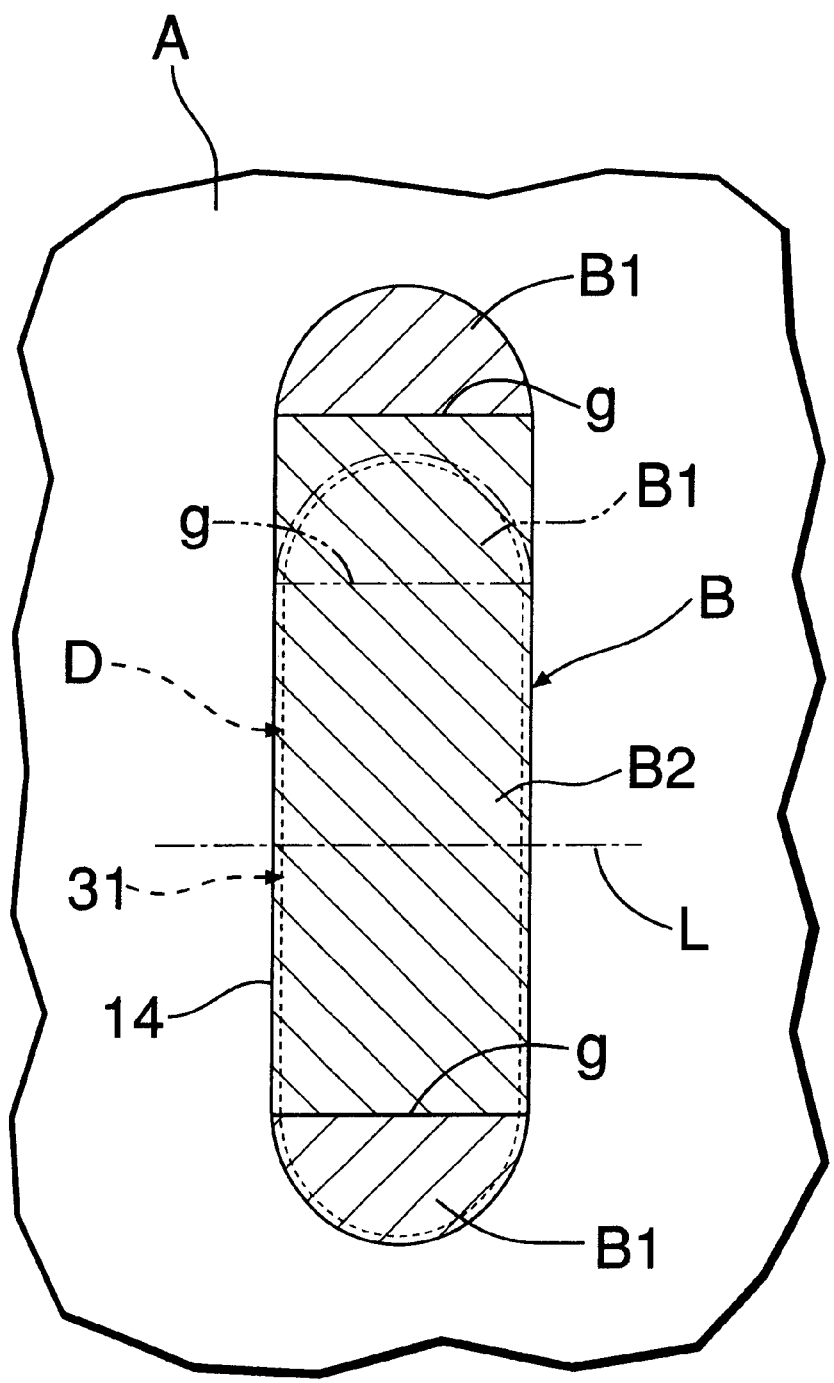
FIG. 9 illustrates sectional configurations of a rotor chamber and a rotor.
Figure 10:
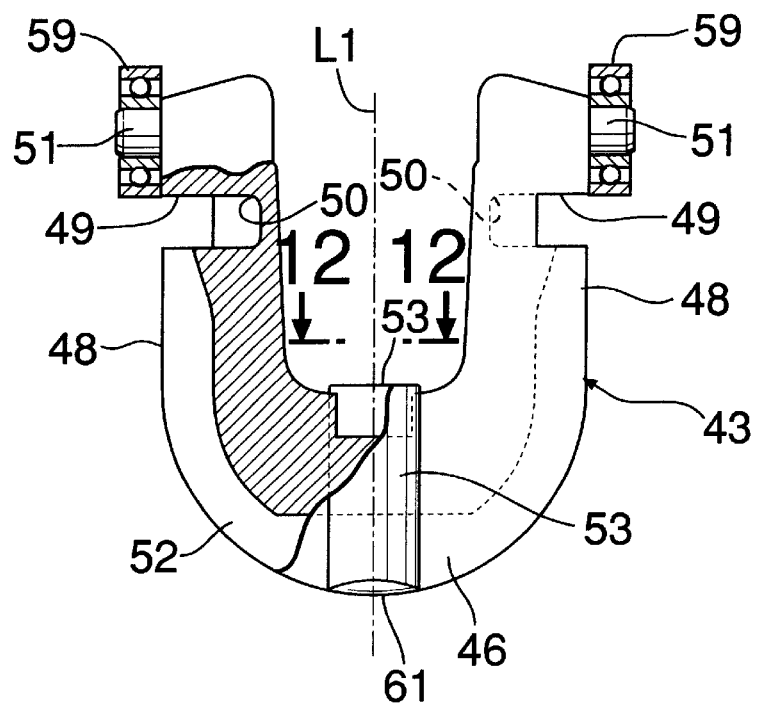
FIG. 10 is a front view of a vane body.
Figure 11:
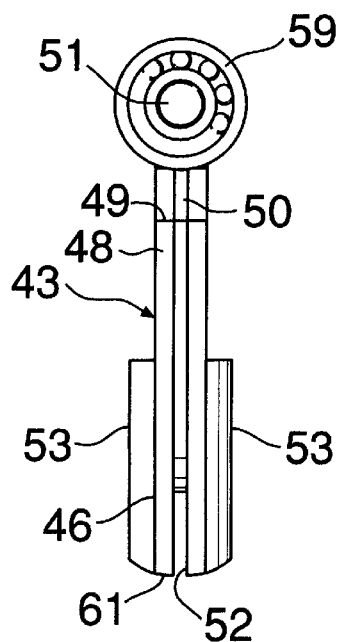
FIG. 11 is a side view of the vane body.
Figure 12:
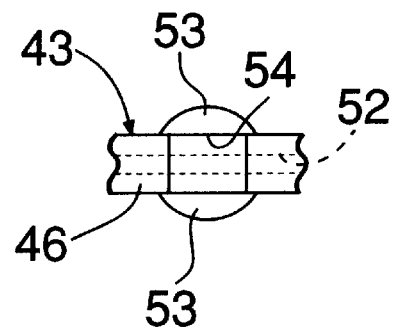
FIG. 12 is a sectional view taken along a line 12—12 in FIG. 10.
Figure 13:
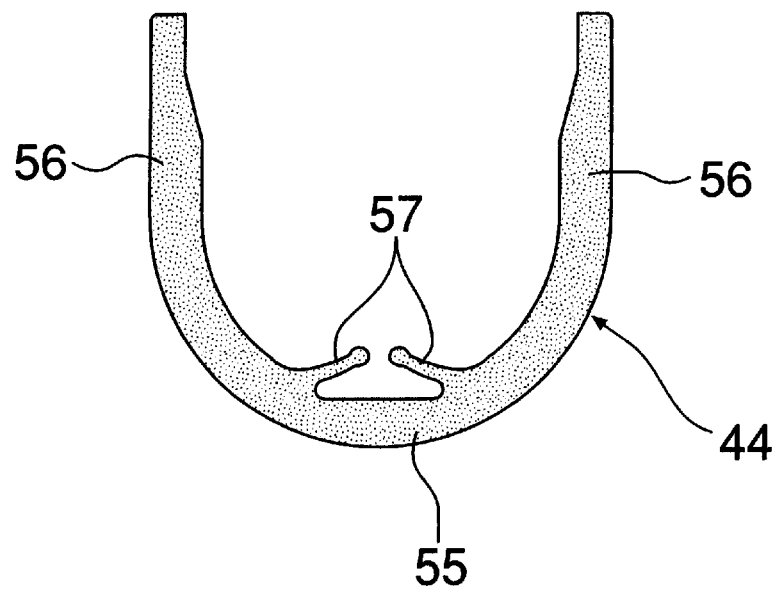
FIG. 13 is a front view of a seal member.

As shown in FIGS. 5 and 9, a section B of the rotor chamber 14 in a phantom plane A including the rotation axis L of the rotor 31 is formed of a pair of semi-circular sections B1 with their diameters g opposed to each other and a rectangular section B2 formed by connecting opposed one end of diameters g of the semi-circular sections B1 to each other and opposed other ends of the diameters g to each other, respectively, and is substantially in the form of an athletic track. In FIG. 9, a part illustrated by a solid line shows the largest section including the large diameter, while a part partially illustrated by a double-dotted chain line shows the smallest section including the small diameter. The rotor 31 has a section D slightly smaller than the smallest section including the small diameter of the rotor chamber 14, as shown by a dotted line in FIG. 9.

As is clearly shown in FIGS. 5, 10 to 13, a vane 42 comprises a vane body 43 in the form of substantially U-shaped plate (horseshoe shape), and a seal member 44 in the form of substantially U-shaped plate mounted to the vane body 43, and a vane spring 58.

The vane body 43 has semi-circular arcuate portions 46 corresponding to an inner peripheral surface 45 by the semi-circular section B1 of the rotor chamber 14, and a pair of parallel portions 48 corresponding to opposed inner end surfaces 47 by the rectangular section B2. Each parallel portion 48 is provided, at its end side, with a rectangular U-shaped notch 49, a rectangular blind hole 50 opening into the bottom surface, and a short shaft 51 located at a side closer to the end than the notch 49 and protruding outwards. Outer peripheral portions of the semi-circular arcuate portion 46 and both parallel portions 48 are sequentially formed with U-shaped grooves 52 opening outwards, and both ends of the U-shaped grooves 52 respectively communicate with both the notches 49. Further, both plane parts of the semi-circular arcuate portions 46 are respectively provided with a pair of projecting stripes 53 in arched sections. Both the projecting stripes 53 are disposed such that an axis L1 of a phantom cylinder thereby matches a straight line which bisects a space between the parallel portions 48 and circumferentially bisects the semi-circular arcuate portion 46. Inner ends of the projecting stripes 53 slightly protrude into the space between the parallel portions 48.

The seal member 44 is made of, for example, PTFE and has a semi-circular arcuate portion 55 sliding on the inner peripheral surface 45 by the semi-circular section B1 of the rotor chamber 14 and a pair of parallel portions 56 sliding on the opposed inner end surfaces 47 by the rectangular section B2. Further, a pair of elastic pawls 57 is provided on an inner peripheral surface side of the semi-circular arcuate portion 55 so as to be deflected inwards.

The seal member 44 is mounted to the U-shaped groove 52 of the vane body 43, a vane spring 58 is fitted in each blind hole 50, and further a roller 59 with a ball bearing structure is mounted to each short shaft 51. Each vane 42 is slidably accommodated in each slot-shaped space 34 of the rotor 31, where both the projecting stripes 53 of the vane body 43 are positioned in the guide tube 40 and opposite side portions of the projecting stripes 53 are positioned in both the slots e of the guide tube 40, respectively, thereby allowing the inner end surfaces of the projecting stripes 53 to abut against the outer end surface of the piston 41. Both rollers 59 are respectively placed in rotatable engagement with a substantially oval annular groove 60 formed on the opposed inner end surfaces 47 of the first and second half bodies 8, 9. A distance between the annular groove 60 and the rotor chamber 14 is constant throughout their circumferences. Forward motion of the piston 41 is converted into rotary motion of the rotor 31 via the vane 42 by engagement between the roller 59 and the annular groove 60.

Figure 8:
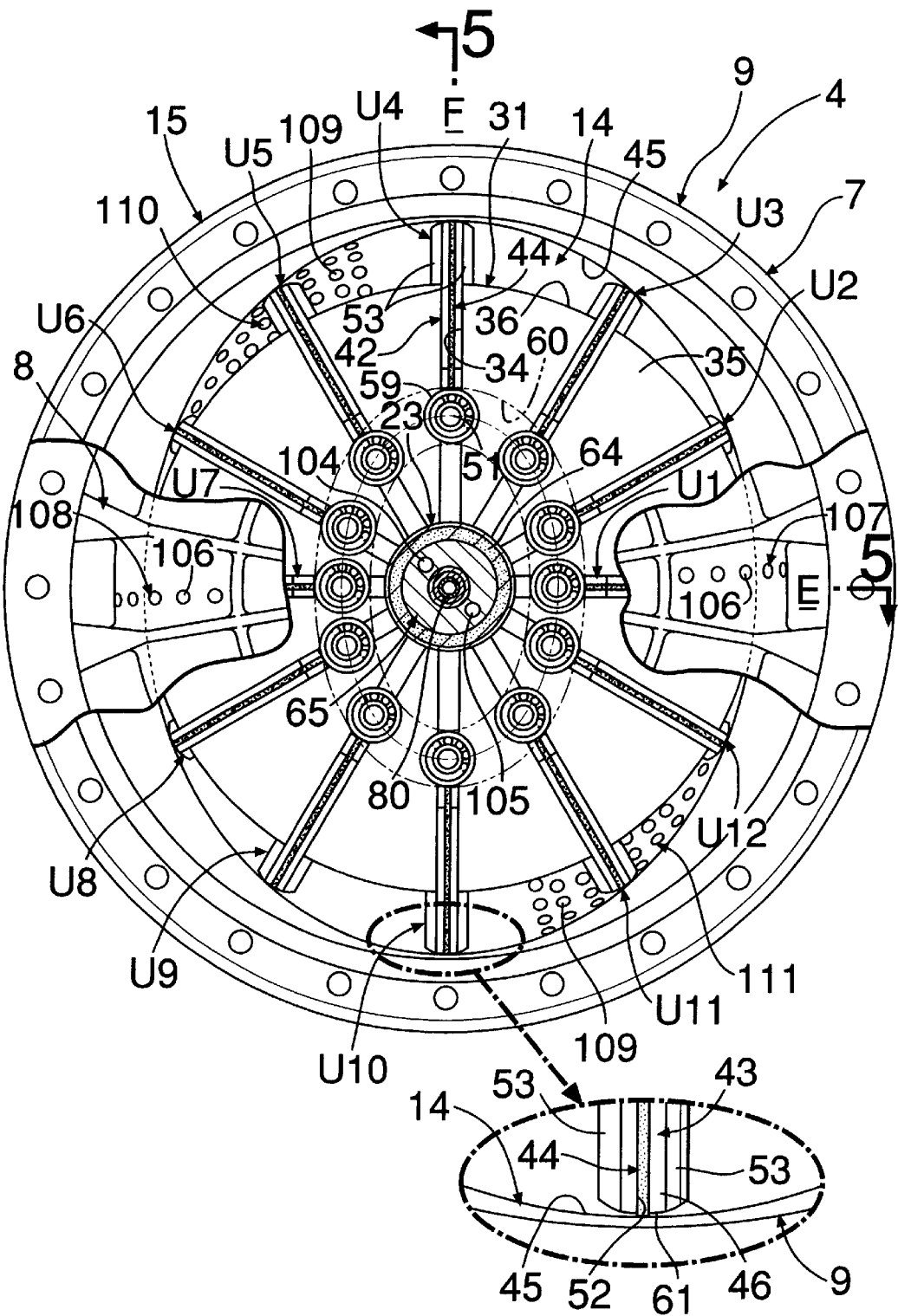
FIG. 8 is an enlarged sectional view of essential portions taken along a line 8—8 in FIG. 5.

By the roller 59 cooperating with the annular groove 60, as is clearly shown in FIG. 8, a semi-circular arcuate tip surface 61 on the semi-circular arcuate portion 46 of the vane body 43 is always spaced apart from the inner peripheral surface 45 of the rotor chamber 14, and the parallel portions 48 are always spaced apart from the opposed inner end surface 47 of the rotor chamber 14, thereby reducing friction losses. Since a track is regulated by the annular grooves 60 formed of two stripes in a pair, the vane 42 is axially rotated at a minute displacement angle via the roller 59 by an error between right and left tracks, and a contact pressure with the inner peripheral surface 45 of the rotor chamber 14 is increased. At this time, in the vane body 43 in the form of substantially U-shaped plate (horseshoe shape), a radial length of a contact portion with the casing 7 is shorter than that in a square (rectangular) vane, so that the displacement amount can be substantially reduced. As is clearly shown in FIG. 5, in the seal member 44, the parallel portions 56 are brought into close contact with the opposed inner end surfaces 47 of the rotor chamber 14 by a spring force of each vane spring 58, and especially exert seal action on the annular groove 60 via ends of the parallel portions 56 and the vane 42. The semi-circular arcuate portion 55 is brought into close contact with the inner peripheral surface 45 by the elastic pawls 57 pushed between the vane body 43 and the inner peripheral surface 45 in the rotor chamber 14. That is, the vane 42 in the form of substantially U-shaped plate has less inflection point than the square (rectangular) vane, which allows good close contact. The square vane has corners, which makes it to difficult to maintain the sealing performance. The sealing performance between the vane 42 and rotor chamber 14 thereby becomes good. Further, the vane 42 and the rotor chamber 14 are deformed concurrently with thermal expansion. At this time, the vane 42 of substantially U shape is deformed with evener similar figures than the square vane, thereby reducing variation of clearance between the vane 42 and the rotor chamber 14 and allowing good sealing performance to be maintained.

Figure 6:
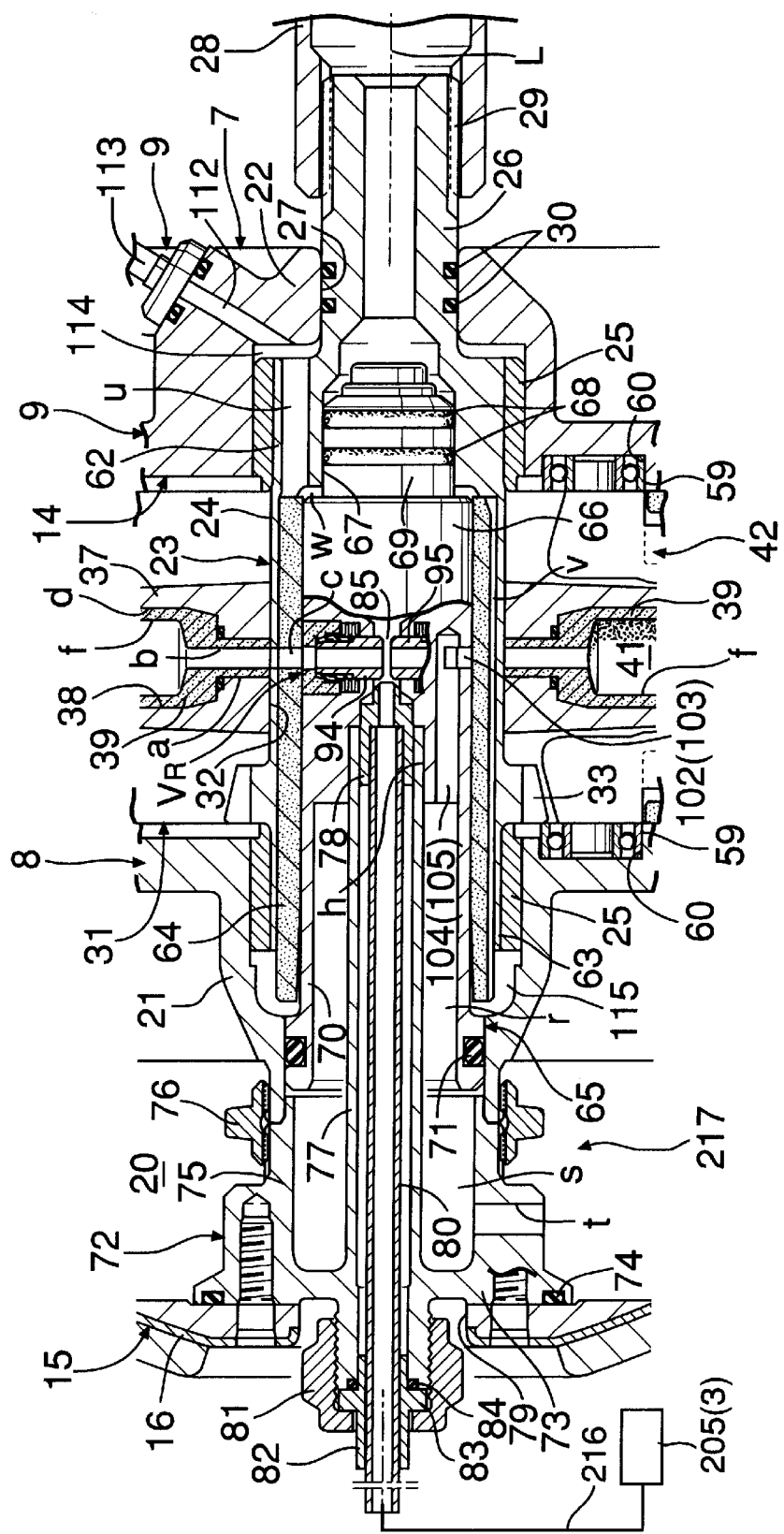
FIG. 6 is an enlarged sectional view around a rotation axis in FIG. 5.

In FIGS. 5 and 6, the large diameter portion 24 of the output shaft 23 has a thick portion 62 supported by the bearing metal 25 of the second half body 9 and a thin portion 63 extending from the thick portion 62 and supported by the bearing metal 25 of the first half body 8. In the thin portion 63, a hollow shaft 64 made of ceramic (or metal) is fitted so as to be rotated integrally with the output shaft 23. Inside the hollow shaft 64, a fixed shaft 65 is disposed, which comprises a large diameter solid portion 66 fitted to the hollow shaft 64 so as to be fitted in an axial thickness of the rotor 31, a small diameter solid portion 69 fitted to a hole 67 at the thick portion 62 of the output shaft 23 via two seal rings 68, and a thin hollow portion 70 extending from the large diameter solid portion 66 and fitted in the hollow shaft 64. A seal ring 71 is interposed between an end outer peripheral surface of the hollow portion 70 and the inner peripheral surface of the hollow shaft receiving tube 21 of the first half body 8.

The main body 16 of the shell-shaped member 15 is mounted, at its inner surface of the central portion, with an end wall 73 of a hollow tube 72 coaxial with the output shaft 23 via a seal ring 74. An inner end side of a short outer tube 75 extending inwards from an outer peripheral portion of the end wall 73 is coupled with the hollow shaft receiving tube 21 of the first half body 8 via a coupling tube 76. On the end wall 73, an inner pipe 77 which has a small diameter and is long is provided so as to penetrate the end wall 73, and an inner end side of the inner pipe 77 is fitted to a stepped hole h at the large diameter solid portion 66 of the fixed shaft 65 together with a short hollow connection pipe 78 projecting therefrom. An outer end portion of the inner pipe 77 projects outwards from a hole 79 of the shell-shaped member 15, and an inner end side of a first introduction pipe 80 for raised temperature vapor inserted from the outer end portion into the inner pipe 77 is fitted in the hollow connection pipe 78. A cap member 81 is screwed on the outer end portion of the inner pipe 77, and by the cap member 81, a flange 83 of a holder tube 82 for holding the introduction pipe 80 is fixed by pressure to the outer end surface of the inner pipe 77 via a seal ring 84.

As shown in FIGS. 2 and 6, the vapor outlet of the first evaporating portion 205 is connected through the conduit 216 to the introduction pipe 80. As shown in FIGS. 2 and 5, a through-hole 232 is formed in the main body 16 of the shell-shaped member 15, and the vapor outlet of the second evaporating portion 206 is connected through the conduit 228 to the through-hole 232.

As shown in FIGS. 5 to 7, and 14, a rotary valve $V_R$ is provided in the large diameter solid portion 66 of the fixed shaft 65, and has a function of supplying and exhausting the vapor to and from each cylinder member 39 with predetermined timing. That is, the first raised temperature vapor is supplied to the cylinder member 39 of the first to twelfth vane-piston units U1 to U12 through a plurality of, in this embodiment twelve, through-holes c successively formed on the hollow shaft 64 and the output shaft 23, and the first dropped temperature/pressure vapor after expansion is exhausted from the cylinder member 39 through the through-holes c.

A configuration of the rotary valve $V_R$ is as follows. As is clearly shown in FIG. 14, in the large diameter solid portion 66, first and second holes 86, 87 extending in opposite directions to each other from a space 85 which communicates with the hollow connection pipe 78 are formed, and the first and second holes 86, 87 open into bottom surfaces of first and second recesses 88, 89 opening into the outer peripheral surface of the large diameter solid portion 66. First and second seal blocks 92, 93 made of carbon having supply ports 90, 91 are mounted to the first and second recesses 88, 89, and their outer peripheral surfaces are rubbed against the inner peripheral surface of the hollow shaft 64. In the first and second holes 86, 87, first and second supply pipes 94, 95 which are coaxial and short are inserted loosely, and taper outer peripheral surfaces i, j of first and second seal tubes 96, 97 fitted to tip side outer peripheral surfaces of the first and second supply pipes 94, 95 are fitted to inner peripheral surfaces of taper holes k, m inside the supply ports 90, 91 of the first and second seal blocks 92, 93 and connected thereto. The large diameter solid portion 66 is formed with first and second annular recesses n, o surrounding the first and second supply pipes 94, 95 and first and second blind-hole-shaped recesses p, q adjacent thereto so as to face the first and second seal blocks 92, 93, and first and second bellows-shaped elastic bodies 98, 99 are accommodated in the first and second annular recesses n, o, and, first and second coil springs 100, 101 are fitted in the first and second blind-hole-shaped recesses p, q, and the first and second seal blocks 92, 93 are pressed against the inner peripheral surface of the hollow shaft 64 by spring forces of the first and second bellows-shaped elastic bodies 98, 99 and the first and second coil springs 100, 101.

In the large diameter solid portion 66, formed between the first coil spring 100 and the second bellows-shaped elastic body 99, and between the second coil spring 101 and the first bellows-shaped elastic body 98 are first and second recess-shaped exhaust portions 102, 103 always communicating with two through-holes c, and first and second exhaust holes 104, 105 extending from the exhaust portions 102, 103 in parallel with the introduction pipe 80 and opening into a hollow portion r of the fixed shaft 65.

The members such as the first seal block 92 and the second seal block 93 which are of the same kind and given a word "first" and a word "second" are in a point symmetrical relationship with respect to the axis of the fixed shaft 65.

There is a passage s of the first dropped temperature/pressure vapor in the hollow portion r of the fixed shaft 65 and in the outer tube 75 of the hollow tube 72, and the passage s communicates with the junction chamber 20 via a plurality of through-holes t penetrating a peripheral wall of the outer tube 75.

As described above, the rotary valve $V_R$ is disposed at the center of the expander 4, and the first raised temperature vapor supplied through the inside of the fixed shaft 65 disposed at the center of the rotary valve $V_R$ is distributed to each cylinder member 39 concurrently with rotation of the rotor 31, which eliminates the need for intake and exhaust valves used in a general piston mechanism to simplify the structure. Since the fixed shaft 65 and the hollow shaft 64 mutually slide at a small diameter portion with low peripheral velocity, the rotary valve $V_R$ can have both sealing performance and wear resistance.

As shown in FIGS. 5 and 8, in the outer peripheral portion of the main body 11 of the first half body 8, formed around both ends of the small diameter of the rotor chamber 14 are first and second introduction hole groups 107, 108 formed of a plurality of introduction holes 106 aligned in the radial direction, and the first dropped temperature/pressure vapor and the second raised temperature vapor in the junction chamber 20 are introduced in the rotor chamber 14 via the introduction hole groups 107, 108. In the outer peripheral portion of the main body 11 of the second half body 9, formed between an end of the large diameter of the rotor chamber 14 and the second introduction hole group 108 is a first leading hole group 110 formed of a plurality of leading holes 109 aligned in the radial and peripheral directions, and formed between the other end of the large diameter and the first introduction hole group 107 is a second leading hole group 111 formed of a plurality of leading holes 109 aligned in the radial and peripheral directions. From the first and second leading hole groups 110, 111, second dropped temperature/pressure vapor with further dropped temperature and dropped pressure is exhausted outside by expansion between the adjacent vanes 42.

The output shaft 23 or the like is lubricated by water, and the lubricating passage is configured as follows. That is, as shown in FIGS. 5 and 6, a water supply pipe 113 is connected to a water supply hole 112 formed in the hollow shaft receiving tube 22 of the second half body 9. The water supply hole 112 communicates with a housing 114 which the bearing metal 25 of the second half body 9 side faces, the housing 114 communicates with a water passing hole u formed in the thick portion 62 of the output shaft 23, the water passing hole u communicates with a plurality of water passing grooves v extending in a generatrix direction of the outer peripheral surface of the hollow shaft 64 (see also FIG. 14), and further each water passing groove v communicates with a housing 115 which the bearing metal 25 of the second half body 8 side faces. An inner end surface of the thick portion 62 of the output shaft 23 is provided with an annular recess w through which the water passing hole u communicates with a slide portion between the hollow shaft 64 and the large diameter solid portion 66 of the fixed shaft 65.

This causes lubrication between each bearing metal 25 and the output shaft 23, and between the hollow shaft 64 and fixed shaft 65 by water, and lubrication among the casing 7 and the seal member 44 and each roller 59 by water having permeated the rotor chamber 14 from the space between the bearing metals 25 and the output shaft 23.

Figure 7:
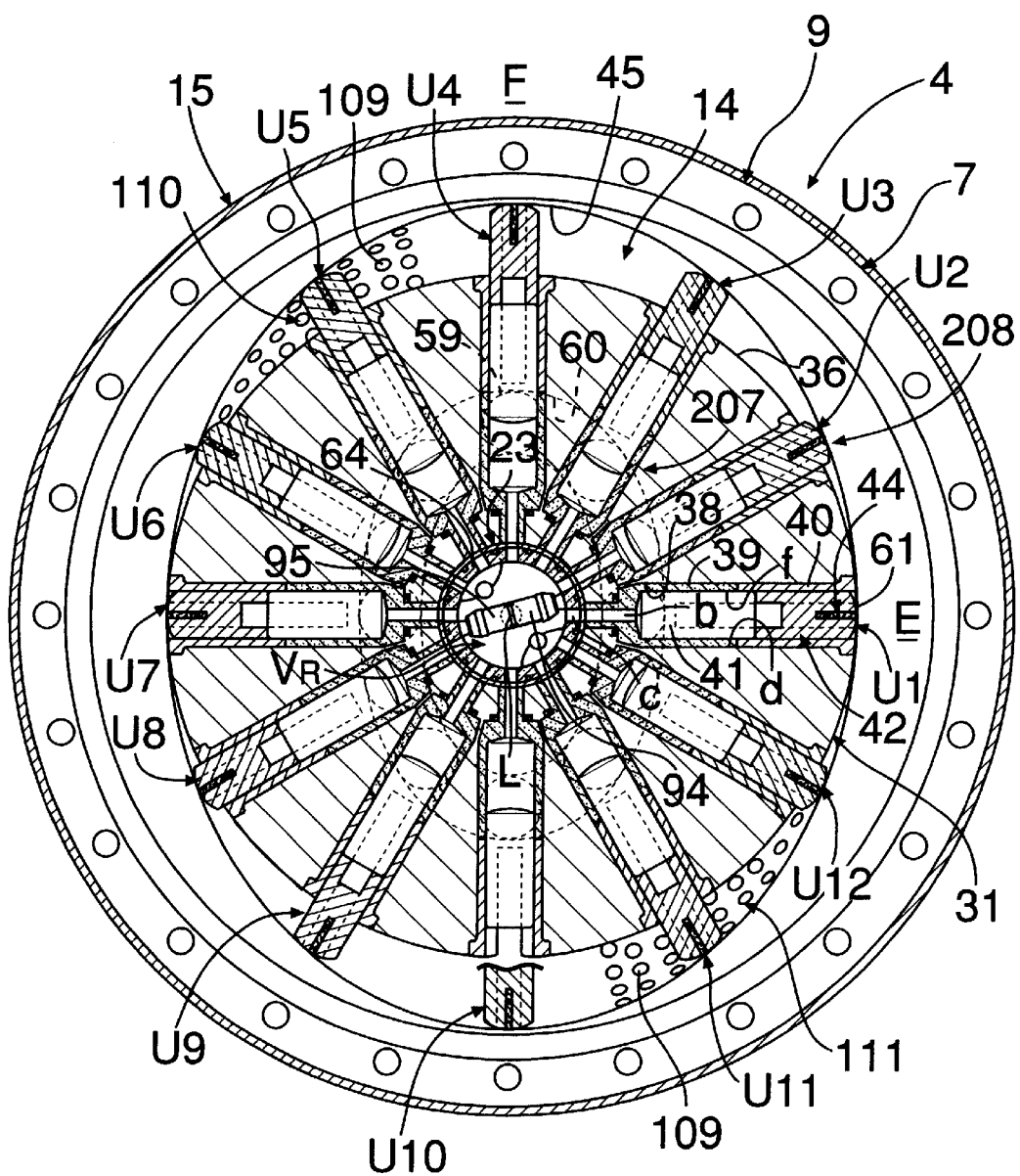
FIG. 7 is a sectional view taken along a line 7—7 in FIG. 5.

In FIG. 7, the first and seventh vane-piston units U1, U7 in a point symmetrical relationship with respect to the rotary axis L of the rotor 31 operate in the same way. This applies to the second and eighth vane-piston units U2, U8 in the point symmetrical relationship.

Figure 14:
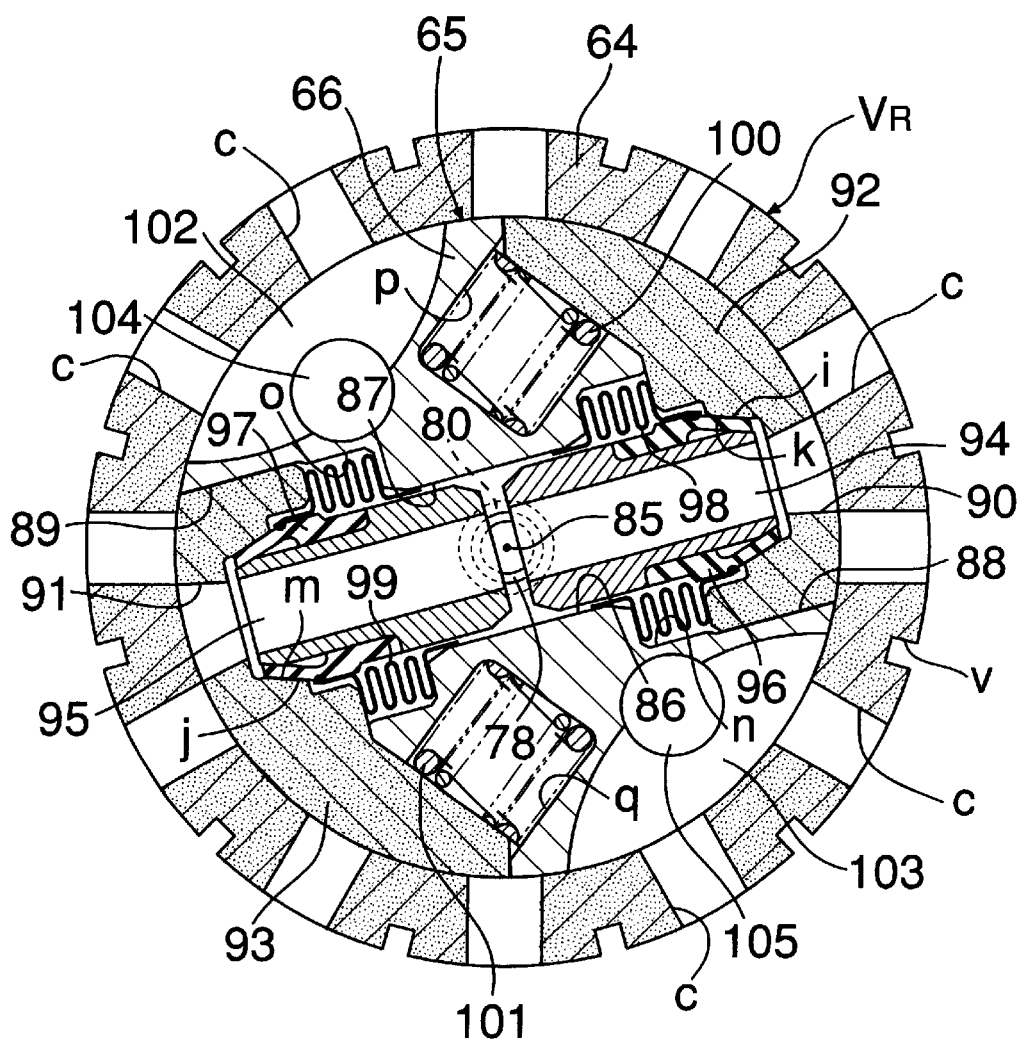
FIG. 14 is an enlarged view around a rotation axis in FIG. 7.

For example, also referring to FIG. 14, an axis of a first supply pipe 94 is slightly shifted in a counterclockwise direction with respect to a small diameter position E of the rotor chamber 14 in FIG. 7, and the first vane-piston unit U1 is located in the small diameter position E and the first raised temperature vapor is not supplied to the large diameter cylinder hole f, and therefore it is assumed that the piston 41 and vane 42 are located in a backward position.

From this condition, the rotor 31 is slightly rotated in the counterclockwise direction in FIG. 7, the supply port 90 of the first seal block 92 communicates with the through-hole c, and the first raised temperature vapor from the first evaporating portion 205 and thus the introduction pipe 80 is introduced in the large diameter cylinder hole f through a small diameter hole b. This causes forward motion of the piston 41, and since the vane 42 slides toward the large diameter position F of the rotor chamber 14, the forward motion is converted into rotary motion of the rotor 31. When the through-hole c is shifted from the supply port 90, the first raised temperature vapor expands in the large diameter cylinder hole f to further move forward the piston 41, thus the rotation of the rotor 31 is continued. The expansion of the first raised temperature vapor ends when the first vane-piston unit U1 reaches the large diameter position F of the rotor chamber 14.

In this way, the expansion energy of the first raised temperature vapor is converted into the rotary energy of the output shaft 23, which is the mechanical energy. Thus, the cylinder member 39, piston 41, vane 42, rotor 31, and casing 7 form the first energy converting portion 207.

Then, by the piston 41 moved backward by the vane 42, the first dropped temperature/pressure vapor in the large diameter cylinder hole f is exhausted to the junction chamber 20 through a small diameter hole b, through-hole c, first recess-shaped exhaust portion 102, first exhaust hole 104, passage s (see FIG. 6), and each through-hole t with the rotation of the rotor 31. In the junction chamber 20, the second raised temperature vapor introduced in the junction chamber 20 from the second evaporating portion 206 is merged into the first dropped temperature/pressure vapor, and the merged vapor is introduced in the rotor chamber 14 through the first introduction hole group 107, as shown in FIGS. 5 and 8, and further expands between the adjacent vanes 42 to rotate the rotor 31, and then the second dropped temperature/pressure vapor is exhausted outwards from the first leading hole group 110.

In this case, the expansion energy of the merged vapor of the first dropped temperature/pressure vapor and the second raised temperature vapor is converted into the rotation energy of the output shaft 23, which is the mechanical energy. Thus, the casing 7, rotor 31, and vane 42 form the second energy converting portion 208. Both mechanical energies of the first and second energy converting portions 207 and 208 are integrated as the rotary energy of the output shaft 23.

The small diameter hole b, through-hole c, first recess-shaped exhaust portion 102 (second recess-shaped exhaust portion 103), first exhaust hole 104 (second exhaust hole 105), passage s, each through-hole t, junction chamber 20, and first introduction hole group 107 (second introduction hole group 108) form the vapor passage 217 connecting the vapor output side of the first energy converting portion 207 and the vapor inlet side of the second energy converting portion 208.

The displacement type expander 4 may be of the type output only based on the first and second raised temperature vapors. The expander is preferably of the displacement type, and as such an expander, not limited to the piston/vane type, but a vane/vane type or a piston/piston type displacement type expander may be used. Further, not limited to the displacement type expander, but a non-displacement type expander such as of a turbine type may be used.

What is claimed is:

1. A waste heat recovery system for a heat source, for recovering waste heat of the heat source that generates at least two, first and second raised temperature portions by operation, a degree of raised temperature being higher at said first raised temperature portion than at said second raised temperature portion, wherein said system comprises: at least two, first and second evaporating portions, the first evaporating portion generating a first vapor with raised temperature by using said first raised temperature portion, while said second evaporating portion generating a second vapor with raised temperature by using said second raised temperature portion and with a lower pressure than said first vapor;

an expander having at least two, first and second energy converting portions, the first energy converting portion converting an expansion energy of said first vapor introduced from said first evaporating portion into a mechanical energy, while said second energy converting portion converting an expansion energy of said second vapor introduced from said second evaporating portion into a mechanical energy, and both mechanical energies being integrated to be output;

wherein said second energy converting portion of said expander has a function of converting an expansion energy of the first vapor, which is introduced from said first evaporating portion, with dropped pressure after said conversion, into a mechanical energy.

2. A waste heat recovery system for a heat source according to claim 1, wherein an expansion ratio of said first vapor is set such that a pressure of the dropped pressure vapor matches a pressure of said second vapor.

3. A waste heat recovery system for a heat source, for recovering waste heat of the heat source that generates at least two, first and second raised temperature portions by operation, a degree of raised temperature being higher at said first raised temperature portion than at said second raised temperature portion, wherein said system comprises: at least two, first and second evaporating portions, the first evaporating portion generating a first vapor with raised temperature by using said first raised temperature portion, while said second evaporating portion generating a second vapor with raised temperature by using said second raised temperature portion and with a lower pressure than said first vapor;

a displacement type expander having at least two, first and second energy converting portions, the first energy converting portion converting an expansion energy of said first vapor introduced from said first evaporating portion into a mechanical energy, while said second energy converting portion converting an expansion energy of said second vapor introduced from said second evaporating portion into a mechanical energy, and both mechanical energies being integrated to be output;

wherein said second energy converting portion of said displacement type expander has a function of converting an expansion energy of the first vapor, which is introduced from said first evaporating portion, with dropped pressure after said conversion, into a mechanical energy.

4. A waste heat recovery system for a heat source according to claim 3, wherein an expansion ratio of said first vapor is set such that a pressure of the dropped pressure vapor matches a pressure of said second vapor.

5. A waste heat recovery system for an internal combustion engine, to which Rankine cycle is applied, for recovering waste heat of the internal combustion engine that generates at least two, first and second raised temperature portions by operation, a degree of raised temperature being higher at said first raised temperature portion than at said second raised temperature portion, wherein said system comprises: evaporating means having at least two, first and second evaporating portions, the first evaporating portion generating a first vapor with raised temperature by using said first raised temperature portion, while said second evaporating portion generating a second vapor with raised temperature by using said second raised temperature portion and with a lower pressure than said first vapor;

an expander having at least two, first and second energy converting portions, the first energy converting portion converting an expansion energy of said first vapor introduced from said first evaporating portion into a mechanical energy, while said second energy converting portion converting an expansion energy of said second vapor introduced from said second evaporating portion into a mechanical energy, and both mechanical energies being integrated to be output;

a condenser for liquefying said first and second vapors, which are exhausted from the expander, with dropped pressure after said conversion; and a supply pump for supplying liquid from the condenser to said first and second evaporating portions, respectively;

wherein said second energy converting portion of said expander has a function of converting an expansion energy of the first vapor, which is introduced from said first evaporating portion, with dropped pressure after said conversion, into a mechanical energy.

6. A waste heat recovery system for an internal combustion engine according to claim 5, wherein an expansion ratio of said first vapor is set such that a pressure of the dropped pressure vapor matches a pressure of said second vapor.

7. A waste heat recovery system for an internal combustion engine, to which Rankine cycle is applied, for recovering waste heat of the internal combustion engine that generates at least two, first and second raised temperature portions by operation, a degree of raised temperature being higher at said first raised temperature portion than at said second raised temperature portion, wherein said system comprises: evaporating means having at least two, first and second evaporating portions, the first evaporating portion generating a first vapor with raised temperature by using said first raised temperature portion, while said second evaporating portion generating a second vapor with raised temperature by using said second raised temperature portion and with a lower pressure than said first vapor;

a displacement type expander having at least two, first and second energy converting portions, the first energy converting portion converting an expansion energy of said first vapor introduced from said first evaporating portion into a mechanical energy, while said second energy converting portion converting an expansion energy of said second vapor introduced from said second evaporating portion into a mechanical energy, and both mechanical energies being integrated to be output;

a condenser for liquefying said first and second vapors, which are exhausted from the displacement type expander, with dropped pressure after said conversion; and a supply pump for supplying liquid from the condenser to said first and second evaporating portions, respectively;

wherein said second energy converting portion of said displacement type expander has a function of converting an expansion energy of the first vapor, which is introduced from said first evaporating portion, with dropped pressure after said conversion, into a mechanical energy.

8. A waste heat recovery system for an internal combustion engine according to claim 7, wherein an expansion ratio of said first vapor is set such that a pressure of the dropped pressure vapor matches a pressure of said second vapor.

* * * * *